United States Patent

Asada

Patent Number: 5,912,608
Date of Patent: *Jun. 15, 1999

[54] PLANAR TYPE ELECTROMAGNETIC ACTUATOR

[75] Inventor: Norihiro Asada, Urawa, Japan

[73] Assignee: The Nippon Signal Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/776,457

[22] PCT Filed: Apr. 26, 1996

[86] PCT No.: PCT/JP96/01149

§ 371 Date: Jan. 14, 1997

§ 102(e) Date: Jan. 14, 1997

[87] PCT Pub. No.: WO96/37943

PCT Pub. Date: Nov. 28, 1996

[30] Foreign Application Priority Data

May 26, 1995 [JP] Japan .................................. 7-128056

[51] Int. Cl.⁶ ............................. G02B 7/18; G01R 13/38
[52] U.S. Cl. ........................ 335/222; 335/223; 335/229; 359/198; 359/199; 359/212; 359/213; 359/223; 359/226; 310/36
[58] Field of Search ........................ 335/222, 223, 335/224, 229, 231; 310/36; 73/668; 359/198, 199, 212–213, 223–226

[56] References Cited

U.S. PATENT DOCUMENTS

| 4,421,381 | 12/1983 | Ueda et al. ............................ 350/6.6 |
| 4,818,966 | 4/1989 | Miyamoto et al. ..................... 335/296 |
| 5,543,956 | 8/1996 | Nakagawa et al. ..................... 359/225 |

FOREIGN PATENT DOCUMENTS

| 0 692 729 A1 | 1/1996 | European Pat. Off. ........ G02B 26/10 |
| 60-107017 | 6/1985 | Japan . |
| 7-1755005 | 7/1995 | Japan . |
| 7-218857 | 8/1995 | Japan . |

Primary Examiner—Michael L. Gellner
Assistant Examiner—Raymond Barrera
Attorney, Agent, or Firm—Wolf, Greenfield & Sacks, P.C.

[57] ABSTRACT

The present invention relates to a planar type electromagnetic actuator of two axis construction, having two movable plates (12A, 12B) with pivotal supports at right angles to each other. A pair of static magnetic field generating devices (4, 5) are arranged facing each other on either side of the movable plates (12A, 12B), and aligned with one diagonal direction of the movable plates (12A, 12B) so that a magnetic field acts on the movable plates (12A, 12B). A magnetic force due to the mutual action with a current flowing through drive coils (15A, 15B), acts on the movable plates (12A, 12B), to thus drive the movable plates (12A, 12B). As a result, the number of components for the magnetic field generating devices can be reduced, the construction of the electromagnetic actuator simplified, and construction costs reduced.

6 Claims, 3 Drawing Sheets

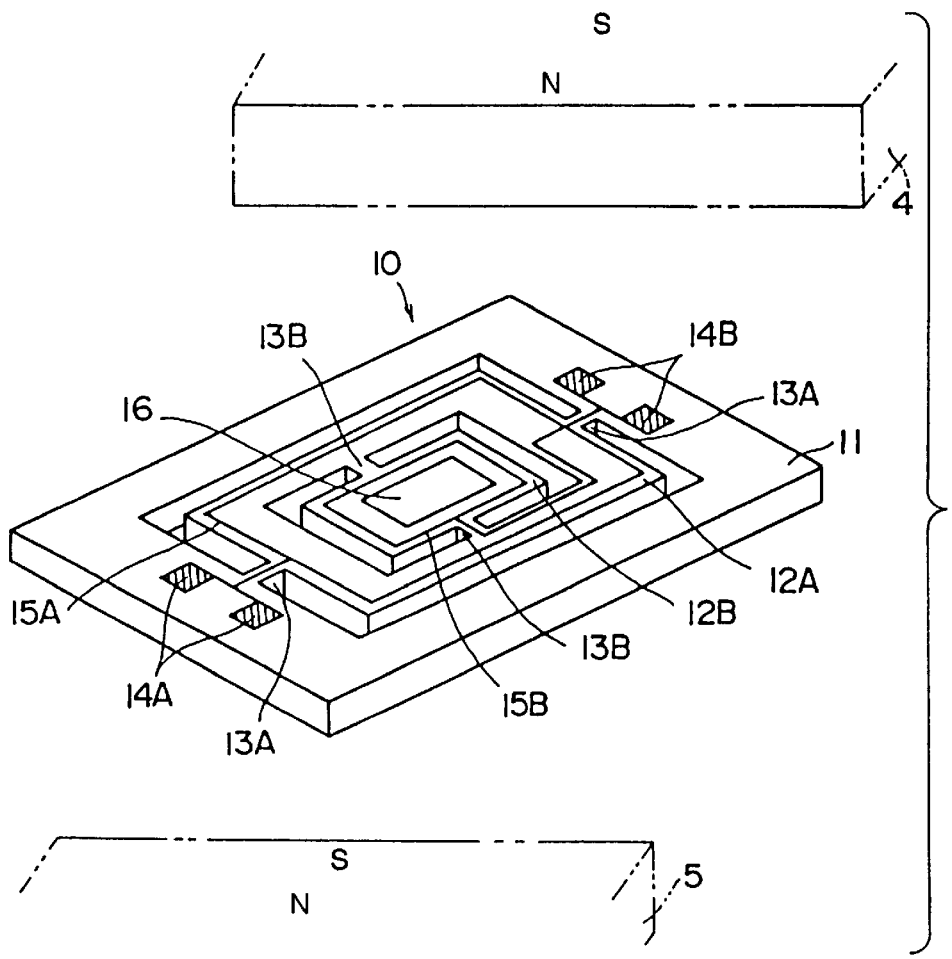
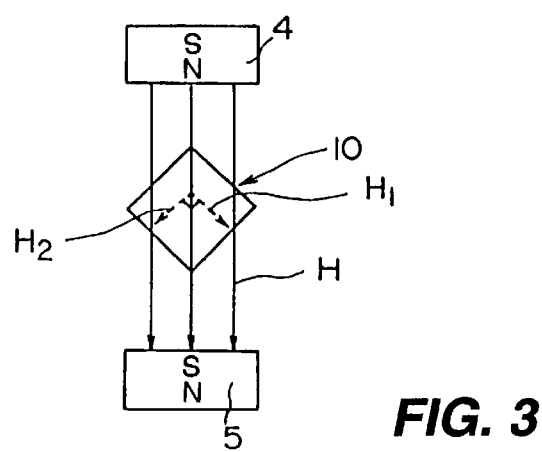
FIG. 2
FIG. 3

PLANAR TYPE ELECTROMAGNETIC ACTUATOR

FIELD OF THE INVENTION

The present invention relates to a planar type electromagnetic actuator in which miniaturization has been realized through the use of semiconductor manufacturing technology, and in particular to a technique for reducing the cost of planar type electromagnetic actuators.

DESCRIPTION OF THE PRIOR ART

The present inventor has previously proposed a very small size planar type electromagnetic actuator which utilizes semiconductor technology. This device is suitable for example for a planar type mirror galvanometer (Japanese Patent Application Nos. 5-320524 and 6-9824).

A description of this planar type electromagnetic actuator is given below.

The electromagnetic actuator comprises a silicon substrate on which is integrally formed a planar movable portion, and an axial support portion of torsion bar construction for axially supporting the movable portion so as to be able to swing at a central location of the movable portion relative to the silicon substrate in a perpendicular direction thereof. A planar coil of thin copper film, for generating a magnetic field by means of a current, is provided on a peripheral upper surface of the movable portion. Moreover, permanent magnets serving as static magnetic field generating devices forming a pair with each other, are provided at the periphery of the movable portion so that the static magnetic field generated thereby acts on the planar coil portions located on the opposite sides of the movable portion which are parallel with the axial direction of the axial support portion. With the abovementioned patent applications, pairs of permanent magnets are respectively located above and below the opposite side portions of the movable portion, the construction being such that the static magnetic fields generated between the pairs of permanent magnets intersect the drive coil in predetermined directions.

Such an electromagnetic actuator is driven by passing a current through the planar coil. That is to say, a static magnetic field is formed by means of the permanent magnets on opposite sides of the movable portion, in a direction so as to intersect the planar coil lying along the planar face of the movable portion. When a current flows in the planar coil positioned in this static magnetic field, a magnetic force acts in a direction according to Fleming's left hand rule for current, magnetic flux density, and force, on the opposite sides of the movable portion in proportion to the current and magnetic flux density, as represented by the following equation (1), so that the movable portion is rotated.

$$F = i \times B \tag{1}$$

where F is the magnetic force, i is the current flowing in the drive coil, and B is the magnetic flux density of the static magnetic field generated by the permanent magnets.

On the other hand, the axial support portion is twisted with the rotation of the movable portion, producing a spring reaction force, so that the movable portion rotates to a position where the magnetic force and the spring reaction force are in equilibrium. The angle of rotation of the moveable portion is proportional to the current flowing in the planar coil, and hence the rotation angle of the movable portion can be controlled by controlling the current flowing in the planar coil.

Consequently, if for example a mirror is provided on a central surface of the movable portion, then the direction of reflection of a laser beam incident on the mirror in a plane perpendicular to the axis of the axial support portion, can be freely controlled. Hence the device can be used as a mirror galvanometer for carrying out laser beam scanning by cyclic operation to continuously change the mirror displacement angle.

One such electromagnetic actuator, has a two axis construction with two axial support portions at right angles to each other.

That is to say, the movable portion formed integral with the silicon substrate is made up of a frame like outer movable plate and a planar inner movable plate located within the frame of the outer movable plate. Moreover, the axial support portions comprise first torsion bars for axially supporting the outer movable plate, and a second torsion bars aligned perpendicular to the first torsion bars, for axially supporting the inner movable plate relative to the outer movable plate. Moreover, respective drive coils are provided on the upper surfaces of the outer and inner movable plates.

With this arrangement, it is necessary for the respective static magnetic fields to act at right angles to each other, on the drive coil on the upper face of the outer movable plate and the drive coil on the upper face of the inner movable plate.

Therefore, in the case of the electromagnetic actuator of the conventional two axis construction, the permanent magnets for driving the outer movable plate and the permanent magnets for driving the inner movable plate are provided separate to each other. For example, as with the beforementioned patent application examples where respective pairs of permanent magnets are located above and below the respective four sides of the movable portion, or permanent magnets are located at the four respective sides, the mutually opposing permanent magnets act in pairs to generate mutually perpendicular magnetic fields relative to the movable portion. That is to say, with the conventional construction, at least four permanent magnets, in other words two pairs of static magnetic field generating devices, are required.

The present invention takes into consideration the above situation with the object of providing an electromagnetic actuator wherein the construction is simplified and manufacturing costs reduced, by having only one pair of static magnetic field generating devices for generating static magnetic fields mutually perpendicular to the movable portion.

SUMMARY OF THE INVENTION

Accordingly, the construction incorporates: a movable portion comprising a frame like outer movable plate and an inner movable plate located within the outer movable plate, and an axial support portion comprising first torsion bars for axially supporting the outer movable plate so as to be able to swing, and second torsion bars aligned axially at right angles to the first torsion bars, for axially supporting the inner movable plate so as to be able to swing, integrally formed on a semiconductor substrate; drive coils provided on respective peripheral portions of the outer movable plate and inner movable plate; and static magnetic field generating devices for applying a static magnetic force to the drive coils, the construction being such that the movable portion is driven by a magnetic field produced by passing a current through the drive coils, and is characterized in that one pair of the static magnetic field generating devices are provided on one diagonal line of the movable portion with the movable portion therebetween.

With such a construction, a static magnetic field directed from one of the pair of static magnetic field generating devices to the other, intersects the movable portion at an angle. Analyzing the vector component decomposition of the static magnetic field, then two mutually perpendicular static magnetic field components are obtained for the respective sides of the movable portion. Consequently, due to these two static magnetic field components, it is possible to have magnetic forces acting on the respective outer and inner movable plates.

Moreover, the construction may be such that the pair of static magnetic field generating devices are fixed to a yoke made from a magnetic body and located surrounding the movable portion.

With such a construction, the ineffective component of static magnetic field which does not intersect the movable plates but instead leaks to the peripheral region of the static magnetic field generating devices, can be reduced, so that the efficiency of the static magnetic field generating devices can be increased.

Moreover, the pair of static magnetic field generating means may be permanent magnets located with a north pole and south pole facing each other.

With such an arrangement, the construction can be simplified compared to the case where electromagnets or the like are used.

The permanent magnet may be rare earth type magnets.

With such a construction, a greater magnetic field can be made to act, increasing the magnetic force.

A mirror galvanometer may be formed with a reflective mirror on a central face of the inner movable plate of the movable portion.

The basic construction of the mirror galvanometer may include; a movable portion incorporating the reflective mirror, a scanner body provided with an axial support portion and a drive coil, a yoke comprising a frame shape magnetic body surrounding the scanner body, and permanent magnets secured to the yoke and aligned with one diagonal direction of the scanner body with the scanner body therebetween, arranged on an insulation substrate, and a plurality of electrical terminal pins electrically connected to the drive coil and fitted to the insulation substrate.

BRIEF DESCRIPTION OF THE DRAWINGS

FIG. 2 is an enlarged diagram of a scanner body of the first embodiment;

FIG. 3 is a diagram for explaining the operation of the first embodiment; and

DETAILED DESCRIPTION

An embodiment of the present invention will now be described with reference to the drawings.

Figure 1:
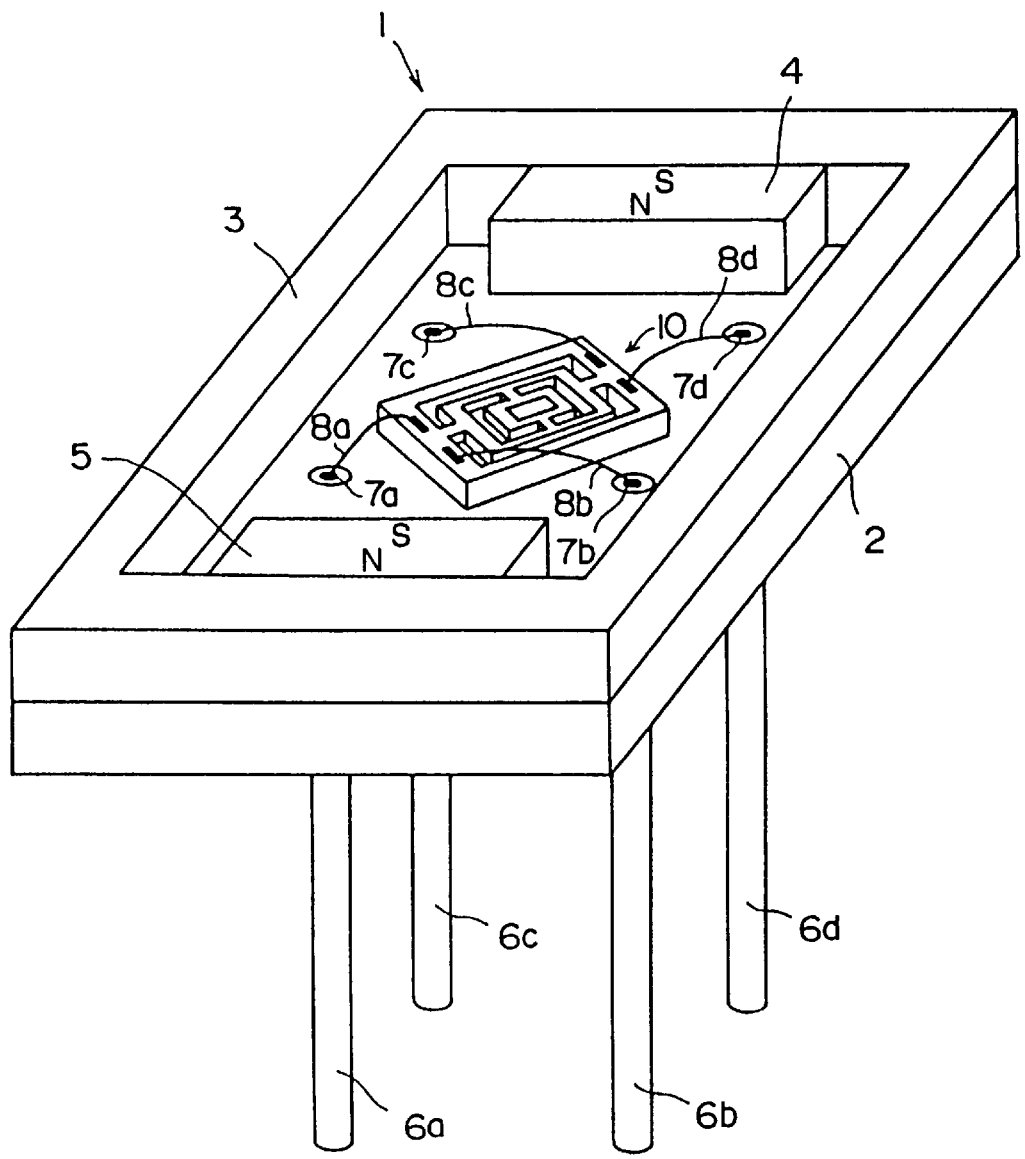
FIG. 1 is a schematic diagram of a first embodiment of an electromagnetic actuator according to the present invention.

FIG. 1 shows the construction of an embodiment of an electromagnetic actuator according to the present invention applied to a mirror galvanometer.

In FIG. 1, a mirror galvanometer 1, being the electromagnetic actuator of this embodiment, has a scanner body 10 with a movable portion and an axial support portion formed integrally on a semiconductor substrate such as a silicon substrate, positioned centrally on an insulation plate 2 and rotated 45 degrees about a Normal to the insulation plate 2 as shown in the figure. A frame like yoke 3 made for example from a magnetic body such as pure iron, is provided on an upper peripheral face of the insulation plate 2. A pair of permanent magnets 4, 5 serving as static magnetic field generating devices, are provided on the inside of two mutually facing sides of the yoke 3. With the permanent magnets 4, 5 the south and north poles face each other so that a static magnetic field is produced from one permanent magnet 4 (or 5) towards the other permanent magnet 5 (or 4), intersecting the scanner body 10. With this embodiment, the static magnetic field is produced from the permanent magnet 4 towards the permanent magnet 5.

Four connector pins 6a~6d serving as electrical terminal pins, are fitted to the insulation plate 2. The respective connector pins 6a~6d are electrically connected to four bonding pads 7a~7d which are formed on the insulation plate 2. Respective planar coils 15A, 15B of the scanner body 10 (to be described in detail later) are connected to the respective bonding pads 7a~7d via conductors 8a~8d. The construction is such that for example the connector pins 6a, 6b and 6c, 6d are in respective pairs, with one as a positive pole and the other as a negative pole, and current is conducted via the connector pins 6a, 6b to the planar coil 15A of the outer movable plate 12A (to be described later), and via the connector pins 6c, 6d to the planar coil 15B of the inner movable plate 12B (to be described later).

A description of the construction of the scanner body 10 will now be given with reference to FIG. 2.

With the scanner body 10, a movable portion comprising a frame like outer movable plate 12A and a planar inner movable plate 12B, and an axial support portion comprising first torsion bars 13A, 13A for axially supporting the outer movable plate 12A, and second torsion bars 13B, 13B for axially supporting the inner movable plate 12B relative to the outer movable plate 12A formed with their axes at right angles to each other, are integrally formed on a silicon substrate 11 by anisotropic etching. The thickness of the movable portion is made thin compared to the thickness of the silicon substrate 11, so that the movable portion can swing about the axial support portion.

A planar coil 15A (shown typically as a single line in FIG. 2) of for example a thin copper film serving as a drive coil, is formed using an electro-typing method or the like, on the upper face of the outer movable plate 12A, and is electrically connected to a pair of outer electrode terminals 14A, 14A on the silicon substrate 11, by way of one of the first torsion bars 13A, 13A. Moreover a planar coil 15B (shown typically as a single line in FIG. 2) serving as a drive coil, is formed by the same method as for the planar coil 15A, on the upper face peripheral portion of the inner movable plate 12B, and is electrically connected to a pair of inner electrode terminals 14B, 14B on the silicon substrate 11, by way of the other of the first torsion bars 13A, 13A, passing from one of the second torsion bars 13B, 13B via the outer movable plate 12A portion. Moreover, a total reflection mirror 16 made for example by aluminum vapor deposition, is formed on the upper face central portion of the inner movable plate 12B. The pair of outer electrode terminals 14A, 14A, and inner electrode terminals 14B, 14B are formed similarly to the planar coils 15A, 15B, by an electro-typing method or the like.

A description of the operation of the electromagnetic actuator of this construction will now be given.

The magnetic field produced by the permanent magnet 4 is directed towards the permanent magnet 5, intersecting the scanner body 10 on the insulation substrate 2. Analyzing the vector components of the magnetic field, then as shown in FIG. 3, the magnetic field H has a transverse component magnetic field $H_1$ and a longitudinal component magnetic field $H_2$ intersecting at right angles to each other in the plane of the scanner body 10. In the case of the present embodiment, the transverse component magnetic field $H_1$ is aligned at right angles to the axial direction of the first torsion bars 13A, 13A for axially supporting the outer movable plate 12A, while the longitudinal component magnetic field $H_2$ is aligned at right angles to the axial direction of the second torsion bars 13B, 13B for axially supporting the inner movable plate 12B.

As a result, if a current is passed via the connector pins 6a, 6b, through the planar coil 15A of the outer movable plate 12A, then a magnetic force F according to equation (1) is generated by the effect of the current and the transverse component magnetic field $H_1$, to thus drive the outer movable plate 12A. Moreover, in a similar manner, if a current is passed via the connector pins 6c, 6d, through the planar coil 15B of the inner movable plate 12B, then a magnetic force F according to equation (1) is generated by the effect of the current and the longitudinal component magnetic field $H_2$, to thus drive the inner movable plate 12B.

Consequently, the outer movable plate 12A and the inner movable plate 12B can be displaced using only one pair of permanent magnets 4, 5, and hence there is no need to provide separate permanent magnets for the outer movable plate and the inner movable plate, as with the conventional arrangement. Therefore, the number of components for the electromagnetic actuator can be reduced and the construction simplified, and hence the manufacturing costs for the electromagnetic actuator can be reduced.

Moreover due to the provision of the yoke 3, the efficiency of the magnetic field produced by the permanent magnets 4, 5 can be increased so that a large magnetic force can be obtained.

Figure 4A:
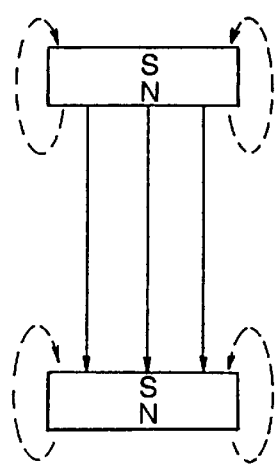
FIG. 4(A) illustrating the magnetic field condition for when there is no yoke, and FIG. 4(B) illustrating the magnetic field condition for when there is a yoke.
Figure 4B:
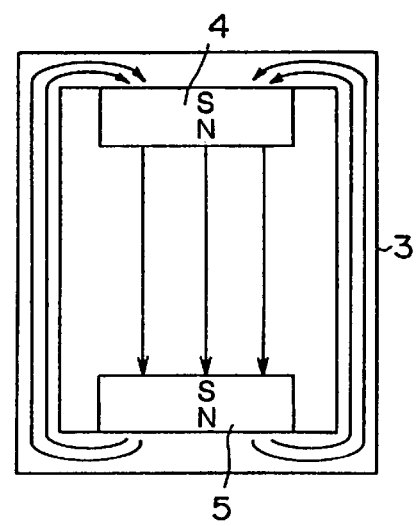
FIG. 4 is a diagram for explaining the effect of a yoke.

That is to say, as shown in FIG. 4(A), there is an ineffective magnetic field at the peripheries of the permanent magnets 4 and 5 as shown by the dotted line, which does not intersect the scanner body 10 and thus has no relation to movement of the movable portion. However, by providing the yoke 3, then as shown in FIG. 4 (B), the ineffective magnetic field can be guided to the other permanent magnet as an effective magnetic field H. Hence the amount of ineffective magnetic field can be reduced, and the effective magnetic field shown by the full lines in the figure, which intersects the scanner body 10 and thus contributes to the displacement of the movable portion, increased. Consequently, in the case where permanent magnets of the same properties are used, then by providing the yoke 3, the efficiency of the permanent magnets can be increased compared to when the yoke is not provided, so that a large magnetic force can be obtained.

An electromagnet may also be used for the static magnetic field generating device. However with an electromagnet, electrical wiring is required. Hence the construction using the permanent magnets as with the present embodiment, is simpler and thus more desirable. Furthermore, in particular, by using a rare earth type magnet, a large magnetic field H can be obtained, and the magnetic force thus increased.

The example given for the present embodiment, has been for an electromagnetic actuator applied to a planar type mirror galvanometer. However, the invention is not limited to this.

With the present embodiment as described above, since the pair of static magnetic field generating devices are provided aligned with the diagonal direction of the movable portion which has two movable plates axially supported at right angles to each other, then the two movable plates can be driven with only one pair of static magnetic field generating devices. The number of components for the electromagnetic actuator can thus be reduced and the construction simplified, and hence the manufacturing costs for the electromagnetic actuator can be greatly reduced. Moreover, since a yoke is provided, then the efficiency of the static magnetic field generating devices can be increased, and hence the drive force for the movable portion thus increased.

The present invention enables a simplification and reduction in cost of instruments which incorporate very small size planar type electromagnetic actuators, and hence industrial applicability is considerable.

What is claimed is:

1. A planar type electromagnetic actuator comprising:
    a movable portion integrally formed on a semiconductor substrate including:
        a frame-like outer movable plate;
        an inner movable plate located within said outer movable plate, said inner movable plate being concentric with said outer movable plate; and
        an axial support portion including first torsion bars for axially supporting said outer movable plate so that said outer movable plate is rotatable around a first axis defined by said first torsion bars, and second torsion bars aligned axially transverse to said first torsion bars, for axially supporting said inner movable plate so that said inner movable plate is rotatable around a second axis defined by said second torsion bars transverse to said first axis;
    a static magnetic field generating means for generating a static magnetic field transverse to said first axis and said second axis;
    a first drive coil provided on a peripheral portion of said outer movable plate, wherein a first magnetic field generated by passing a first current through said first drive coil interacts with said static magnetic field to rotate said outer movable plate about said first axis; and
    a second drive coil provided on a peripheral portion of said inner movable plate, wherein a second magnetic field generated by passing a second current through said second drive coil interacts with said static magnetic field to rotate said inner movable plate about said second axis.

2. The planar type electromagnetic actuator according to claim 1, wherein said static magnetic field generating means include a pair of elements fixed to a yoke made from a magnetic body and located surrounding said movable portion.

3. The planar type electromagnetic actuator according to claim 2, wherein said pair of elements are permanent magnets located with a north pole and south pole facing each other.

4. The electromagnetic actuator according to claim 3, wherein said permanent magnets are rare earth type magnets.

5. The electromagnetic actuator according to claim 1, further comprising a reflective mirror on a central face of said inner movable plate of said movable portion to form a mirror galvanometer.

6. A light director comprising:
    a movable portion integrally formed on a semiconductor substrate including:

a frame-like outer movable plate;

an inner movable plate located within said outer movable plate, said inner movable plate being concentric with said outer movable plate;

an axial support portion including first torsion bars for axially supporting said outer movable plate so that said outer movable plate is rotatable around a first axis defined by said first torsion bars, and second torsion bars aligned axially transverse to said first torsion bars, for axially supporting said inner movable plate so that said inner movable plate is rotatable around a second axis defined by said second torsion bars transverse to said first axis; and a reflective mirror on a central face of said inner movable plate;

a yoke, having a frame-shaped magnetic body, located surrounding said movable portion;

a static magnetic field generating means for generating a static magnetic field transverse to said first axis and said second axis, said static magnetic field generating means consisting of a pair of permanent magnets bonded to opposite sides of said yoke, said permanent magnets located with a north pole and a south pole facing each other;

a first drive coil provided on a peripheral portion of said outer movable plate, wherein a first magnetic field generated by passing a first current through said first drive coil interacts with said static magnetic field to rotate said outer movable plate about said first axis;

a second drive coil provided on a peripheral portion of said inner movable plate, wherein a second magnetic field generated by passing a second current through said second drive coil interacts with said static magnetic field to rotate said inner movable plate about said second axis;

an insulating substrate for supporting said movable portion, said yoke and said static magnetic field generating means, whereon said first axis and said second axis of said movable portion are aligned transversely to said static magnetic field; and electrical terminal pins fitted to said insulating substrate for connecting to said first drive coil and said second drive coil.

\* \* \* \* \*